United States Patent [19]

Nogami et al.

[11] Patent Number: 5,224,512
[45] Date of Patent: Jul. 6, 1993

[54] VALVE STEM DRIVING APPARATUS

[75] Inventors: Takeki Nogami; Kunio Matsushita, both of Takamatsu; Susumu Watanabe, Hiratsuka; Yuzo Hashimoto, Fujisawa, all of Japan

[73] Assignees: Shikoku Research Institute Inc.; Shikoku Electric Power Company, Inc.; Nippon Gear Co., Ltd., all of Kanagawa, Japan

[21] Appl. No.: 893,983

[22] Filed: Jun. 5, 1992

[51] Int. Cl.⁵ .............................................. F16K 37/00
[52] U.S. Cl. .................................... 137/554; 137/553; 137/552; 251/129.11; 251/249.5; 74/424.8 VA; 73/162
[58] Field of Search ....................... 137/552, 553, 554; 251/129.11, 129.12, 129.13, 249.5; 74/424.8 VA; 73/7, 162

[56] References Cited

U.S. PATENT DOCUMENTS

| | | | |
|---|---|---|---|
| 2,818,687 | 3/1959 | Kron et al. | 251/129.03 X |
| 2,917,069 | 12/1959 | Lundy et al. | 251/129.11 X |
| 4,299,251 | 11/1981 | Dugas | 137/554 X |
| 4,545,406 | 10/1985 | King | 137/553 |
| 4,821,769 | 4/1989 | Mills et al. | 137/554 |
| 4,833,453 | 5/1989 | Twerdochlib | 137/554 X |

*Primary Examiner*—John Rivell
*Attorney, Agent, or Firm*—Zarley, McKee, Thomte, Voorhees, & Sease

[57] ABSTRACT

A valve stem driving apparatus comprises a valve stem which has first and second ends, the second end being connected to a valve body. The valve stem is engaged with a stem nut. A distance measuring device is provided in an upper cover for the valve stem and measures a distance between the upper cover and the first end of the valve stem, so that wear rate of the valve stem and/or the stem nut is determined.

14 Claims, 2 Drawing Sheets

VALVE STEM DRIVING APPARATUS

BACKGROUND OF THE INVENTION

The present invention relates to an electric actuator for controlling opening and closing of a portal valve in power equipments or chemical plants and, particularly, a valve stem driving apparatus for detecting wear rate of a valve stem and/or a stem nut to increase reliability of switch control.

As illustrated in FIG. 2, in a known large portal valve 101, an electric actuator 103 which comprises a screw jack 102 controls opening and closing of a valve body 104.

In order to control stopping at fully opened or closed position of the valve body 104 which is operated by the electric actuator 103 to open and close, a position detecting limit switch 107 which comprises a multistage gear mechanism 106 connected to a motor 105 for the electric actuator 103 detects exact stopping positions corresponding to fully opened and closed positions, so that an electromagnetic switch 110 turns on and off a power source 109 via a motor control circuit 108 including the limit switch.

Limiting operation stop positions of the limit switch 107 are normally adjusted in periodical inspection every some years after initial determination, and operation has been performed at the inspection till next inspection.

The multistage gear mechanism 106 for actuating the limit switch 107 is connected to an opening-degree indicator 111 which displays an opening degree of the valve.

Valve is monitored by the limit switch 107 and the mechanical opening-degree indicator 111, both being indirect detecting means on an input shaft of a screw jack 102.

Owing to errors in the points of contact of the limit switch 107 during operation, wear in power transmission system and gaps by damage, there is difference in opening degree corresponding to contact signal of the limit switch or order of mechanical opening degree indicator, thereby making normal operation and observation of valve impossible. If still used, total pipe line control system would be broken.

To increase reliability, it would be useful in indistrial plants if it is monitored whether or not a valve is controlled in a normal position without position detecting mechanism on a valve driving side.

The adjustment position of the limit switch is determined by measuring stem position with a scale such as a depth gauge after removal of a stem cover 112, but direct observation of valve position would make switching means for the stem cover unnecessary and inspection time shortened. It would be useful for decreasing suffering from radioactivity in a nuclear generator.

SUMMARY OF THE INVENTION

According to the present invention, there is provided a valve stem driving apparatus which comprises: a valve stem which has first and second ends, the second end being connected to a valve body; a stem nut which is engaged with the valve stem; a worm wheel which is joined to the stem nut; a screw jack comprising a worm which is engaged with the worm wheel and is connected to a motor; a casing for the screw jack; and distance measuring means for determining an axial movement of the first end of the valve stem.

By measuring a distance between the first end of the valve stem and an upper cover, wear in the stem nut and breakage of valve stem are detected, thereby ensuring safety of opening/closing control of the valve.

There are advantages in this invention as follows:

a) Wear rate of the stem nut is always detected, thereby enabling opening/closing of the valve to be controlled based on the wear rate.

b) Maintenance and inspection such as adjustments of valve opening degree and operation points of the limit switch can be reduced in number or become nil.

c) In industrial plants, it could be directly observed whether or not the valve is controlled at normal position without position detecting mechanism at valve driving side, thereby increasing reliability of the system.

BRIEF DESCRIPTION OF THE DRAWINGS

The present invention will be described in detail with respect to embodiments shown in appended drawings wherein.

PREFERRED EMBODIMENTS OF THE INVENTION

Figure 1:
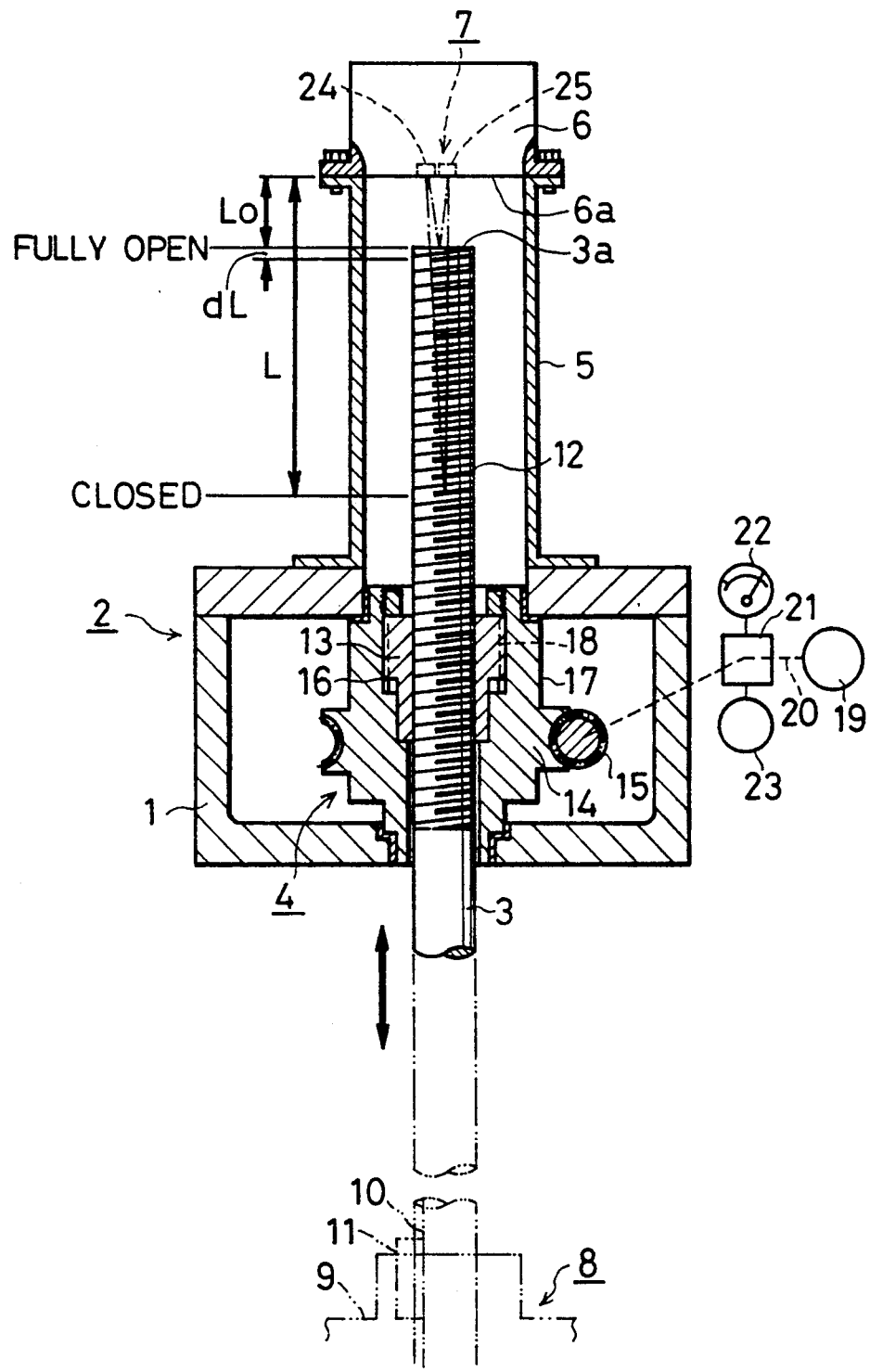
FIG. 1 is a longitudinal sectional view of an embodiment of a valve stem driving apparatus according to the present invention.
Figure 2:
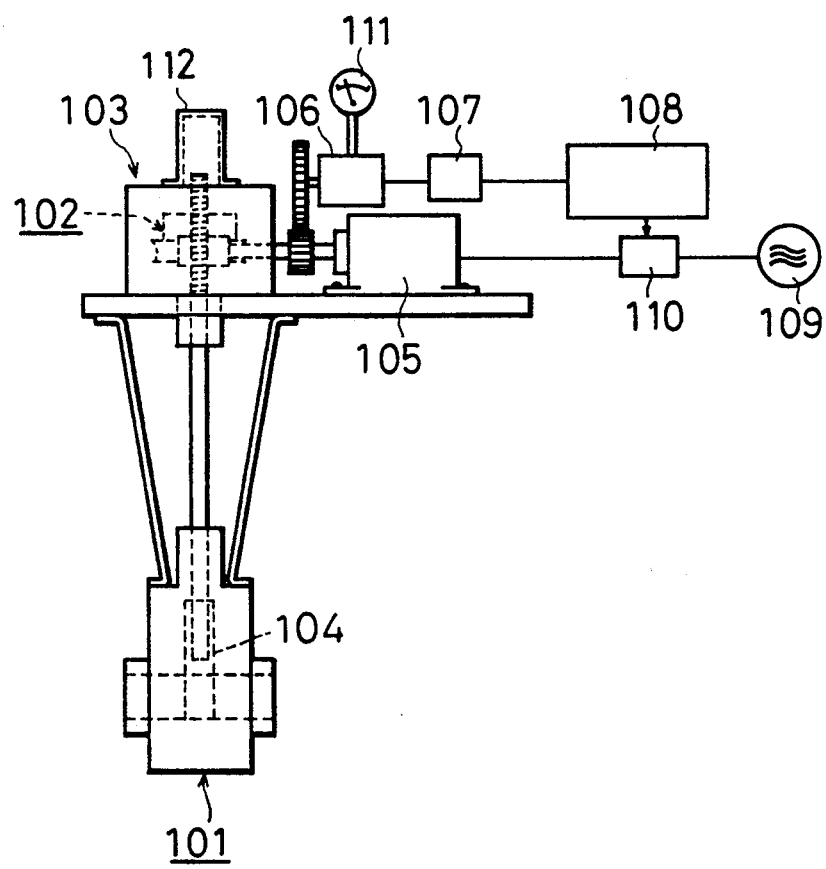
FIG. 2 is a schematic view of a known valve switch.

FIG. 1 is a central longitudinal sectional view of an upper portion of a valve stem which is connected to a valve body of a portal valve, the valve stem having a screw-jack type electric actuator.

The numeral 1 denotes a casing for the electric actuator 2; 3 denotes the valve stem which centrally extends through the casing 1; 4 denotes a screw jack joined to the valve stem 3; 5 denotes a stem cover which extends through the casing 1; and 6 denotes an upper cover which closes the upper end of the stem cover 5 and contains a distance measuring device 7.

The lower portion of the valve stem 3 is joined to the valve body (not shown) of the portal valve 8. At a sliding portion of the valve box 9, a key 11 fixed on a valve box 9 is engaged with an axial groove 10 on the valve stem 3, thereby preventing the valve stem 3 from rotation. In the screw jack 4, a male thread 12 on the upper portion of the valve stem 3 is engaged with a stem nut 13 which is engaged with a worm wheel 14 coaxial with the valve stem 3, the worm wheel 14 meshing with a worm 15.

A spline shaft 16 around the stem nut 13 is engaged with a spline bore 18 on the inner surface of a boss shaft 17, thereby allowing the stem nut 13 to rotate with worm wheel 14.

To a shaft 20 between the worm 15 and a motor 19 is connected a multistage gear 21 which is connected to an opening-degree indicator 22 and a position detecting limit switch 23. The distance measuring device 7 on the upper cover 6 for the stem cover 5 is provided for determining distance between an upper end surface 3a and the upper cover 6. For example, FIG. 1 illustrates an ultrasonic distance measuring device which comprises an ultrasonic generator 24 and an ultrasonic receiver 25 (microphone) on an lower end surface of the upper cover 5. Sound reflected by the upper end surface 3a of the valve stem 3 determines the distance. Laser beams may determine the distance as well.

Measurement of distance between the upper end surface 3a and the upper cover by distance measuring device 7 could represent wear rate of the stem nut at any time. Fully opened valve forms the highest position of the valve stem 3 having a distance "LO". Closed valve forms the lowest position of the valve stem 3 having a distance "L". However, if the stem nut is worn out, the upper end surface 3a of the valve stem 3 lowers by a distance "dL" for the wear rate of the stem nut 13 from the distance "LO" when the opening-degree indicator 22 at driving side points out "FULLY OPEN", thereby determining the wear rate of a pressing-up frictional surface of the stem nut 13.

When the distance measuring device indicates the distance "L" of the closed valve while driven to close the valve, the difference from the closed position indicated by the opening-degree indicator 22 is corresponding to wear rate of both fastening frictional surface and the pressing-up frictional surface of the stem nut. Thus, the total wear rate of the stem nut 13 could be known, thereby preventing the valve stem 3 from disengaging from the stem nut 13.

Any trouble can be known in connecting portions between the valve stem 3 and the valve 8 owing to a large difference in value between the distance measuring device and the opening-degree indicator 22. For example, if the valve stem 3 is broken between the electric actuator 2 and the valve 8 while driven to open the valve, the opening-degree indicator 22 and the limit switch 23 act in the same way as normal time, control operation comes to end as the valve is indicated as "FULLY OPEN". In this case, as a result of breakage of the valve stem, the valve body stops and the control operation ends, thereby causing very dangerous situation. However, if the valve stem 3 is broken in the valve 8, it rotates with the stem nut 13 because the rotation-preventing mechanism of the groove 10 and the key 11 in the valve stem 3 does not work, and measured value of the distance measuring means 7 stops at that time. When the opening-degree indicator 22 points out fully-opened position, much more difference than that caused by wear of the stem nut is known, so that the foregoing trouble could be found.

The measured value by the distance measuring device 7, display value of the opening-degree indicator 22 and opening/closing information of the limit switch 23 may be converted into electric signals and forwarded via transmission means to a central monitoring control unit which judges whether or not the above trouble occurs.

The foregoing merely relates to embodiment of this invention, but any change and modification may be carried out by person skilled in the art within the scope of the following claims wherein:

What is claimed is:

1. A valve stem driving apparatus which comprises:
    a valve stem which has first and second ends, the second end being connected to a valve body;
    a stem nut which is engaged with the valve stem;
    a worm wheel which is joined to the stem nut;
    a screw jack comprising a worm which is engaged with the worm wheel and is connected to a motor;
    a casing for the screw jack;
    distance measuring means for determining an axial movement of the first end of the valve stem; and
    a stem cover on the casing for the screw jack and an upper cover on the stem cover;
    the distance measuring means being provided on a lower surface of the upper cover so as to measure a distance between the lower surface of the upper cover and the first end of the valve stem, thereby determining wear rate of the valve stem and/or the stem nut.

2. A valve stem driving apparatus as defined in claim 1 wherein the distance measuring means comprises an ultrasonic device which comprises an ultrasonic generator and an ultrasonic receiver, whereby the distance between the lower surface of the upper cover and the first end of the valve stem is determined by sound reflected by the first end of the valve stem.

3. A valve stem driving apparatus as defined in claim 1 wherein the distance measuring means comprises a laser beam device.

4. A valve stem driving apparatus as defined in claim 1 wherein an opening-degree indicator for displaying opening degree of valve is connected between the worm and the motor so that trouble in the valve stem and the valve may be known owing to difference in value between the distance measuring means and the opening-degree indicator.

5. A valve stem driving apparatus which comprises:
    a valve stem which has first and second ends, the second end being connected to a valve body;
    a stem nut which is engaged with the valve stem;
    a worm wheel which is joined to the stem nut;
    a screw jack comprising a worm which is engaged with the worm wheel and is connected to a motor;
    a casing for the screw jack;
    distance measuring means for determining an axial movement of the first end of the valve stem; and
    the distance measuring means comprising a laser beam device.

6. A valve stem driving apparatus as defined in claim 5 further comprising a stem cover on the casing for the screw jack and an upper cover on the stem cover, the distance measuring means being provided on a lower surface of the upper cover so as to measure a distance between the lower surface of the upper cover and the first end of the valve stem, thereby determining wear rate of the valve stem and/or the stem nut.

7. A valve stem driving apparatus as defined in claim 6 wherein the distance measuring means comprises an ultrasonic device which comprises an ultrasonic generator and an ultrasonic receiver, whereby the distance between the lower surface of the upper cover and the first end of the valve stem is determined by sound reflected by the first end of the valve stem.

8. A valve stem driving apparatus as defined in claim 5 further comprising an opening-degree indicator connected between the worm and the motor for displaying opening degree of the valve, so that trouble in the valve stem and the valve may be known owing to difference in value between the distance measuring means and the opening-degree indicator.

9. A valve stem driving apparatus which comprises:
    a valve stem which has first and second ends, the second end being connected to a valve body;
    a stem nut which is engaged with the valve stem;
    a worm wheel which is joined to the stem nut;
    a screw jack comprising a worm which is engaged with the worm wheel and is connected to a motor;
    a casing for the screw jack;
    distance measuring means for determining an axial movement of the first end of the valve stem; and
    an opening-degree indicator connected between the worm and the motor for displaying opening degree of the valve, so that trouble in the valve stem and the valve may be known owing to difference in valve between the distance measuring means and the opening-degree indicator.

10. A valve stem driving apparatus as defined in claim 9 further comprising a stem cover on the casing for the screw jack and an upper cover on the stem cover, the distance measuring means being provided on a lower surface of the upper cover so as to measure a distance between the lower surface of the upper cover and the first end of the valve stem, thereby determining wear rate of the valve stem and/or the stem nut.

11. A valve stem driving apparatus as defined in claim 10 wherein the distance measuring means comprises an ultrasonic device which comprises an ultrasonic generator and an ultrasonic receiver, whereby the distance between the lower surface of the upper cover and the first end of the valve stem is determined by sound reflected by the first end of the valve stem.

12. A valve stem driving apparatus as defined in claim 9 wherein the distance measuring means comprises a laser beam device.

13. A valve stem driving apparatus which comprises:
   a valve stem which has first and second ends, the second end being connected to a body of a valve;
   a stem nut which is engaged with the valve stem;
   a worm wheel which is joined to the stem nut;
   a stem jack comprising a worm which is engaged with the worm wheel and is connected to a motor;
   a casing for the screw jack;
   a stem cover on the casing for the screw jack;
   an upper cover on the stem cover;
   an ultrasonic device which comprises an ultrasonic generator and an ultrasonic receiver on a lower surface of the upper cover so as to measure a distance between the lower surface of the upper cover and the first end of the valve stem by sound reflected by the first end of the valve stem, thereby determining wear rate of the valve stem and/or the stem nut; and
   an opening-degree indicator connected between the worm and the motor for displaying opening degree of the valve so that trouble may be known owing to difference in value between the ultrasonic device and the opening-degree indicator.

14. A valve stem driving apparatus as defined in claim 13 wherein the distance measuring means comprises a laser beam device.

* * * * *